Dec. 22, 1970    A. E. WHITECAR    3,549,459
DEVICE FOR SECURING AN ARTICLE TO A CONTAINER
Filed May 8, 1968    10 Sheets-Sheet 1
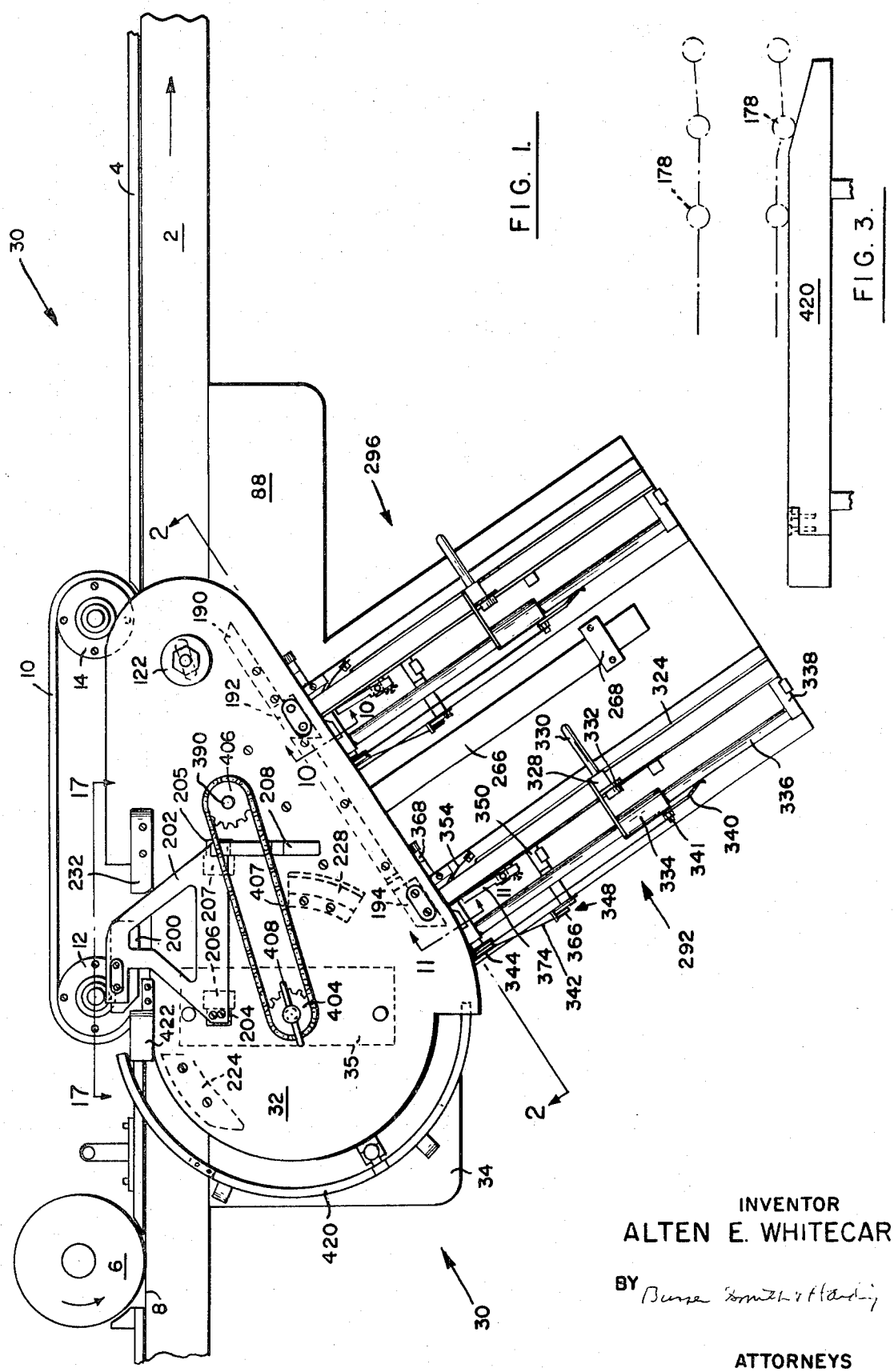
INVENTOR
ALTEN E. WHITECAR
BY
ATTORNEYS

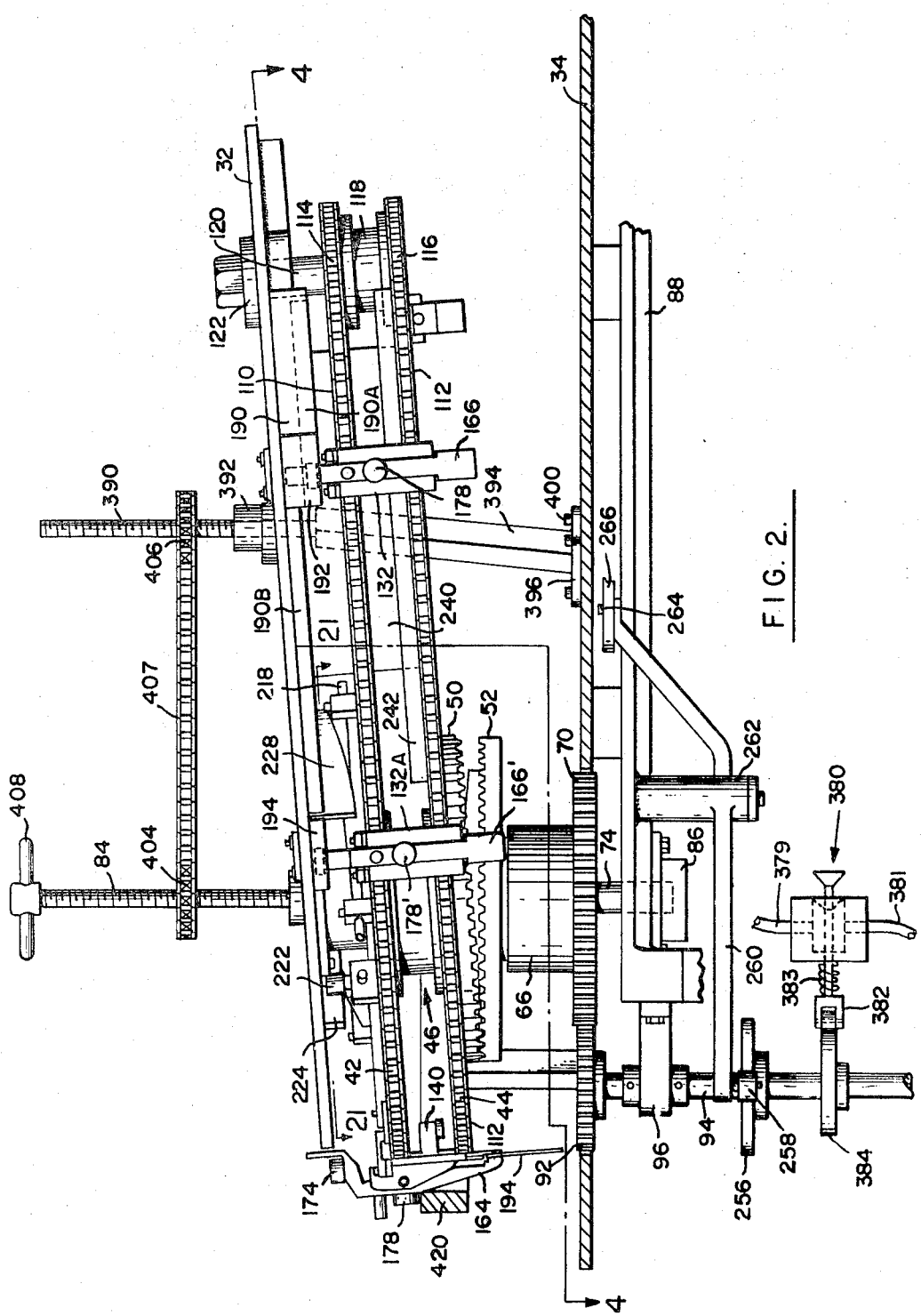

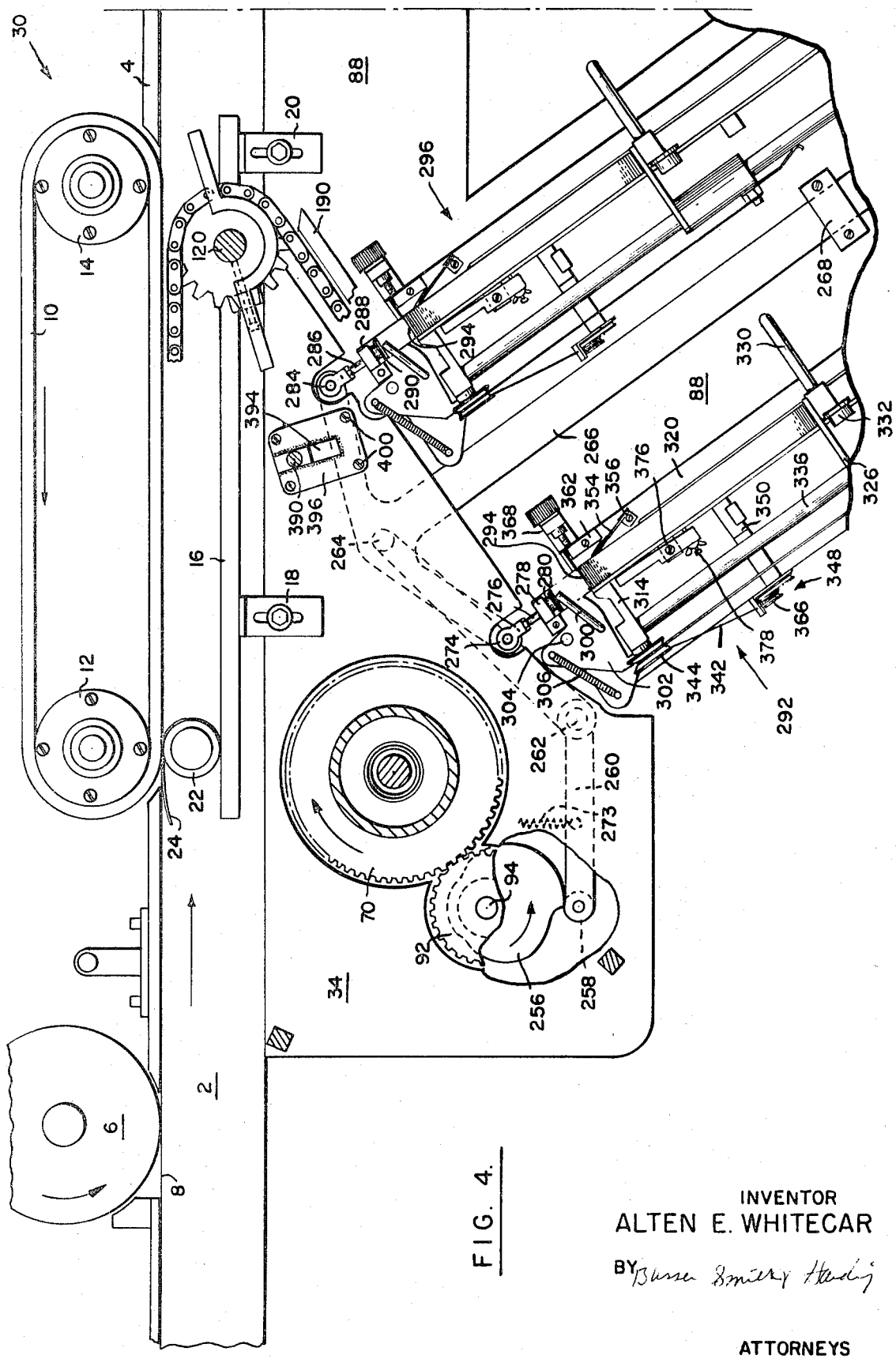

INVENTOR
ALTEN E. WHITECAR
BY Busser Smith & Hardy
ATTORNEYS

Dec. 22, 1970     A. E. WHITECAR     3,549,459
DEVICE FOR SECURING AN ARTICLE TO A CONTAINER
Filed May 8, 1968     10 Sheets-Sheet 6

INVENTOR
ALTEN E. WHITECAR
BY *Busser Smith & Hardy*
ATTORNEYS

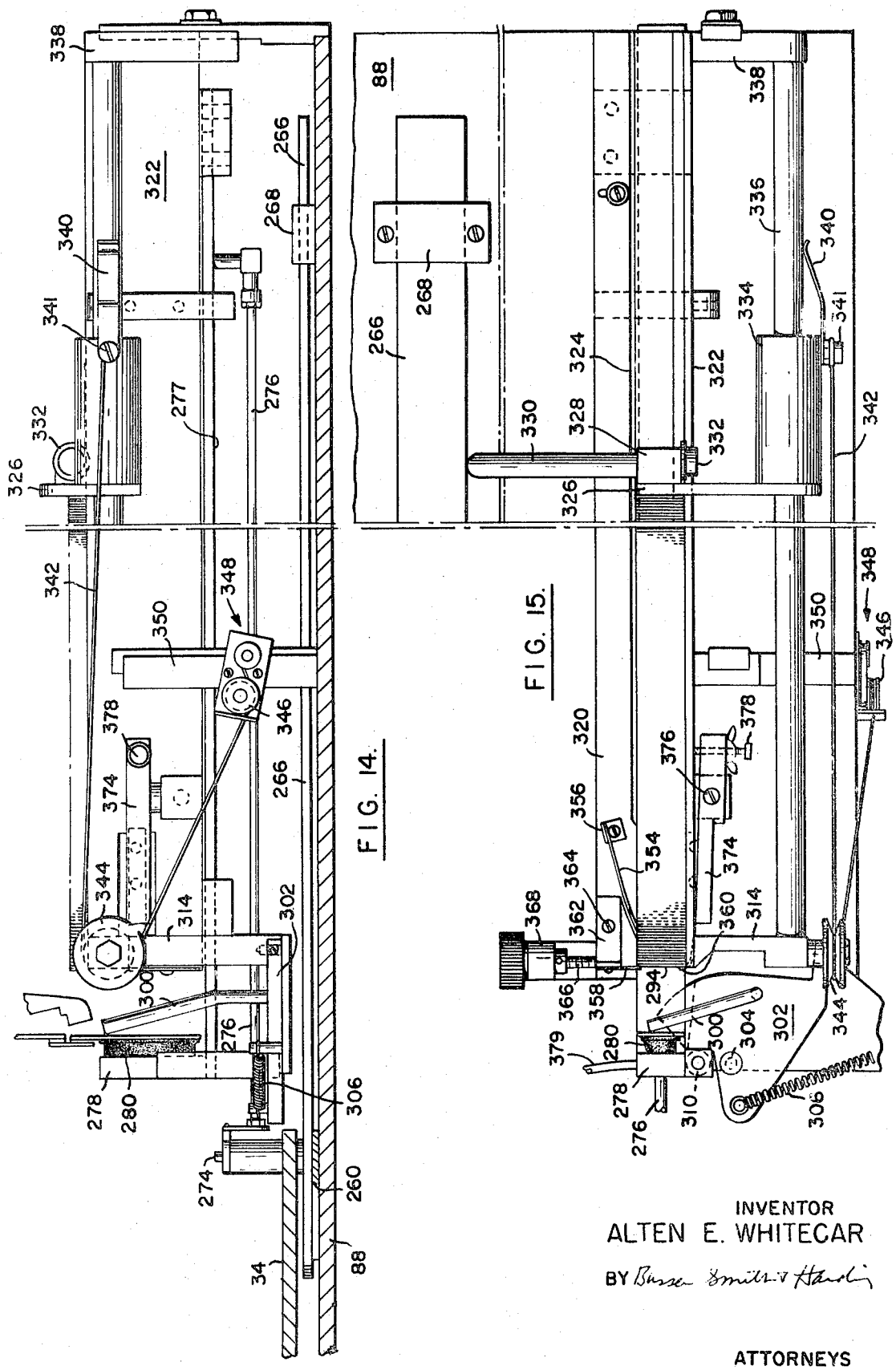

INVENTOR
ALTEN E. WHITECAR

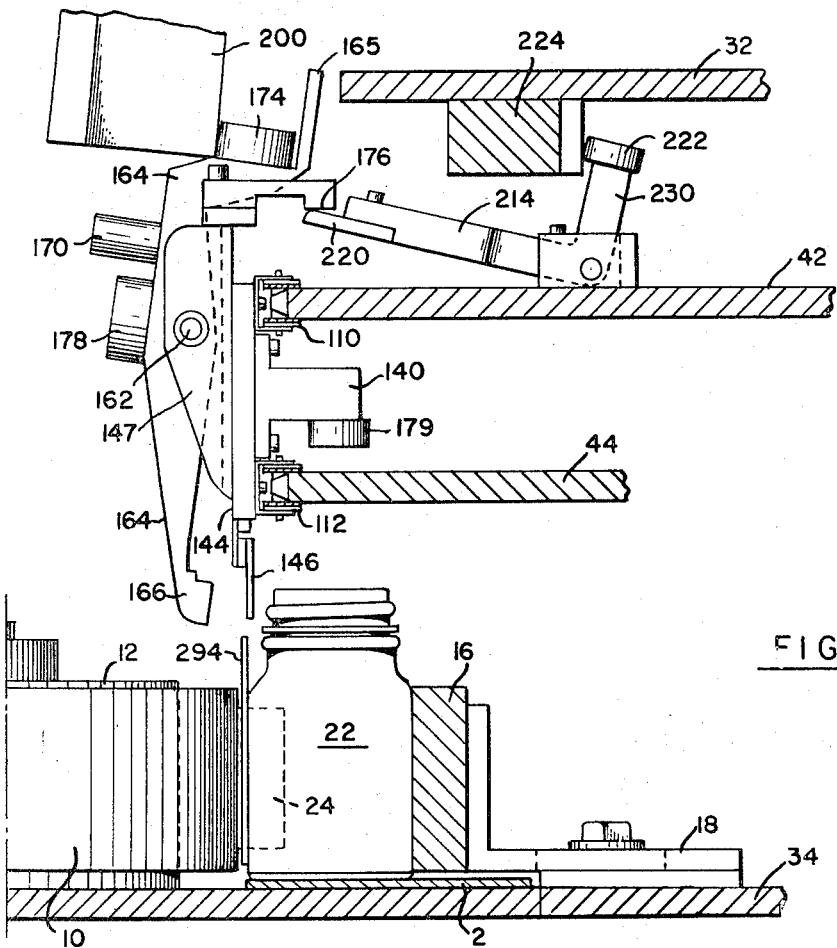

Dec. 22, 1970     A. E. WHITECAR     3,549,459
DEVICE FOR SECURING AN ARTICLE TO A CONTAINER
Filed May 8, 1968                    10 Sheets-Sheet 10

INVENTOR
ALTEN E. WHITECAR

BY Busser Smith & Harding

ATTORNEYS

┌─────────────────────────────────────────────────┐
United States Patent Office                3,549,459
                                    Patented Dec. 22, 1970
└─────────────────────────────────────────────────┘

3,549,459
DEVICE FOR SECURING AN ARTICLE TO A CONTAINER
Alten E. Whitecar, Westville, N.J., assignor to Smith Kline & French Laboratories, Philadelphia, Pa., a corporation of Pennsylvania
Filed May 8, 1968, Ser. No. 727,397
Int. Cl. B65c 9/04, 61/00
U.S. Cl. 156—568                    14 Claims

ABSTRACT OF THE DISCLOSURE

A pair of chains transport finger pickup means from article magazines to containers on a conveyor having labels partially affixed thereto. After positioning and releasing the articles at a predetermined position between the labels and the bottles, the lower portion of the finger pickup means is elevated above the top of the article. The chains lie in planes which make a substantial angle with the plane of the conveyor in order to elevate each finger pickup means after it has released its article to permit its clearing the associated bottle. Screw means provide for the elevating and lowering of the chains to provide for adjustment of the point of release of each article to accommodate different sizes of bottles.

BACKGROUND OF THE INVENTION

It is frequently desired to supply an article along with a container which is accessible without the necessity for opening the container. Typical examples are instruction sheets, premiums, tokens, product samples and money. It is necessary at times to supply informative literature to be read by a dispensing pharmacist and not by the ultimate purchaser with a bottle containing a medicinal preparation.

In my copending application Ser. No. 366,066, filed May 8, 1964, there is disclosed a device for solving this problem. The present invention is advantageous in that it employs article retaining means extending below the tops of the containers to position and release the article at the height at which it is to be secured by a label. In my earlier device, the placement of the article tends to be somewhat irregular since to provide clearance for the container, it was necessary to employ article retaining means which do not extend below the level of the container tops to release the article at a position above the top of the container.

SUMMARY OF THE INVENTION

The invention is for use with a conveyor for spaced containers associated with label transfer means for partially securing a label on a container and with means for wrapping the label about the container as is well known. The invention provides article retaining means to pick up an article at a predetermined position and release it at a predetermined position between a container on the conveyor and a label partially secured to the container. Means continuously transport the article retaining means along an endless path including the said predetermined position. From the point of release of the article, this path is in the direction of the run of the conveyor for a substantial distance and advantageously is inclined upwardly at a substantial angle to carry the article retaining means above the top of the container to which the article was delivered and thus provide for clearance for the conveying means to cross over the bottle and eliminate the necessity for spacing and timing to permit the transporting means to pass between the bottles on the conveyor. Advantageously, when the article is released, the lower portion of the article retaining means is elevated clear of the article to permit the rotation of the article with the bottle and label without any hindrance. This is particularly desirable with smaller diameter bottles where the rotation of the bottle and label carries the article rapidly toward the transport means. The structure is particularly advantageous in that it releases the article substantially in the position in which it is to be secured to the container as contrasted to the prior art which dropped the article from a point above the top of the bottle.

BRIEF DESCRIPTION OF THE DRAWINGS

FIG. 1 is a plan view of a device in accordance with the invention;
FIG. 2 is a vertical section, taken on the plane, indicated by the line 2—2 in FIG. 1;
FIG. 3 is a schematic development of a cam track employed in the device of FIG. 1;
FIG. 4 is a section taken on the planes indicated by the line 4—4 in FIG. 2;
FIG. 14 is a side elevation of an article magazine of the device of FIG. 1;
FIG. 15 is a plan view of the magazine of FIG. 14;
FIG. 18 is a fragmentary elevational view of the device of FIG. 1 illustrating the elevation of the lower portion of an article retaining device after the release of the article;
FIG. 19 is a rear plan view of a label employed with the invention;
FIG. 20 is a front perspective view of a container to which an article has been secured by a label by the device of the invention.

DESCRIPTION OF THE PREFERRED EMBODIMENTS

Figure 5:
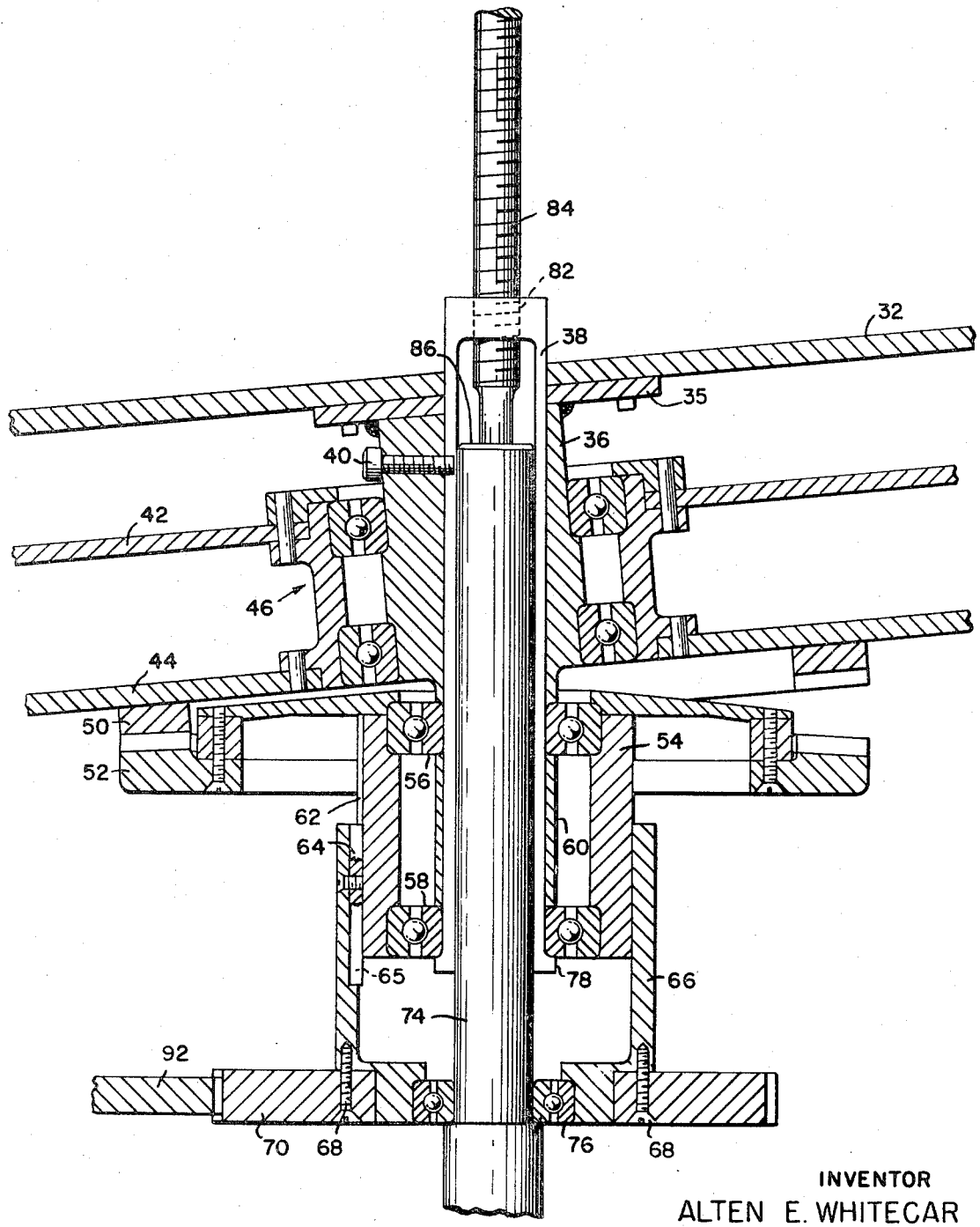
FIG. 5 is a vertical section, partially broken away, through a portion of the drive employed in the device of FIG. 1.
Figure 6:
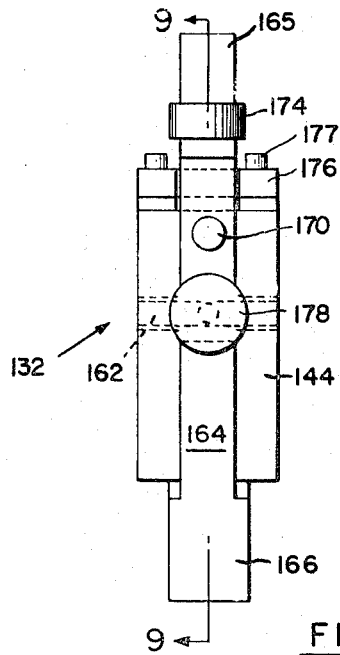
FIG. 6 is a front elevation of an article retaining device employed in the device of FIG. 1.
Figure 7:
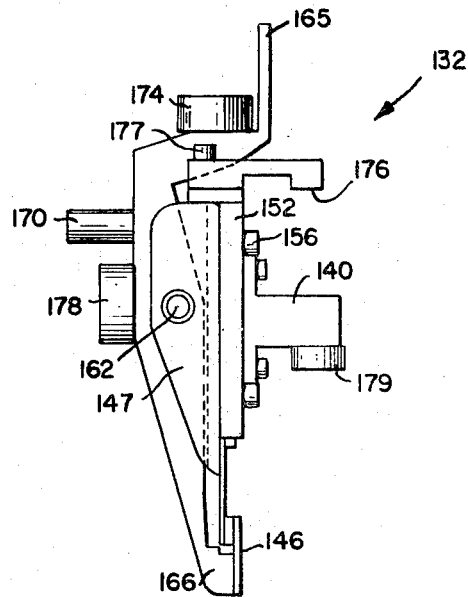
FIG. 7 is a side elevation of the device of FIG. 6.

Referring first to FIG. 1, a conventional belt conveyor 2 runs adjacent to a side rail 4. A pneumatic label transfer drum 6 projects through an opening 8 in rail 4 to deliver a label to a container being advanced on conveyor 2. A side belt 10 is carried by pulleys 12 and 14, the latter pulley being driven so as to move belt 10 at a linear rate in excess of the linear rate of conveyor 2. Opposite belt 10 is a backup rail 16 (FIG. 4), belt 10 and rail 16 acting to rotate a container in order to wrap the label about it.

Rail 16 is mounted on adjustable brackets 18 and 20. FIG. 4 illustrates a bottle 22 having one end of a label 24 secured thereto and engaged between belt 10 and rail 16 for rotation and wrapping of the label 24 about it. Such apparatus is widely used and well-known to the art.

Referring back to FIG. 1, a device 30 for positioning and releasing an article between a container and a label to permit the article to be secured to the container by the label, has a top plate 32 and a bottom plate 34 (FIG 2). As best seen in FIG. 5, plate 32 is fixedly secured to a strengthening plate 35. A hub 36 is welded to plate 35 and in turn is mounted with a close fit on tubular member 38, the tubular member 38 being mounted with its axis substantially vertical and at an angle to the center line of hub 36. A screw 40 in hub 36 is threaded into tubular member 38 to hold against rotation. A pair of sprockets 42 and 44 are rotatably mounted on hub 36 as indicated at 46. A ring gear 50 is fixedly secured to the bottom of sprocket 44 and is driven by a gear 52 which is fixedly secured to a hub 54 mounted for rotation on tubular members 38 by bearings indicated at 56 and 58 which are separated by a sleeve 60. Hub 54 has a slot 62 which receives a key 64 secured in slot 65 in hub 66 which is fixedly secured by machine screws 68 to a gear 70. Hub 66 is mounted for rotation on shaft 74 by a bearing shown at 76. Shaft 74 extends upwardly into member 38 and is freely movable relative thereto.

Tubular member 38 has a flange 78 at its lower end which engages bearing 58 and thus supports bearing 58 and the structure above bearing 58. All of the bearings described thus far are designed to withstand a substantial thrust. The upper portion of tubular member 38 is threaded, as indicated at 82, and is engaged by a threaded rod 84, the lower end of which rests on the top 86 of shaft 74. Thus, the above described structure between flange 78 on tubular member 38 and plate 32, including plate 32, are supported by tubular member 38 which in turn is supported on shaft 74 by virtue of being threadably connected to rod 84. Shaft 74 is supported in a thrust member 86 secured to frame 88 which also carries plate 34 (FIG. 2).

Gear 70 is driven by a gear 92 (FIG. 2) secured to a drive shaft 94 which is driven in timed relation to conveyor 2 by means not shown. Shaft 94 is supported by a bearing shown at 96.

Figure 8:
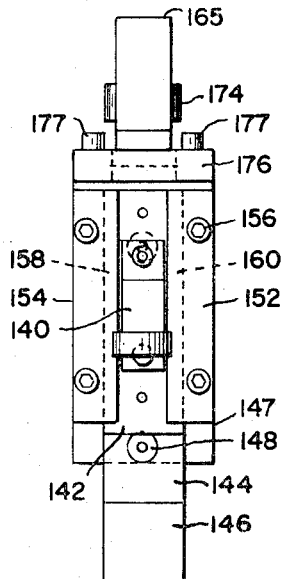
FIG. 8 is a rear elevation of the device of FIG. 6.
Figure 9:
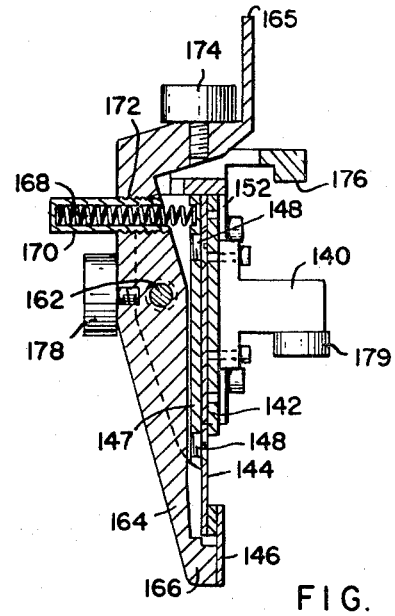
FIG. 9 is a vertical section, taken on the plane, indicated by the line 9—9 in FIG. 6.

Sprockets 42 and 44 carry chains 110 and 112, (FIG. 2) respectively, which are parallel to plate 32. Chains 110 and 112 are also carried by sprockets 114 and 116, respectively, which are mounted on hub 118 which in turn is mounted for free rotation on shaft 120 fixedly secured to plate 32 as indicated at 122. Equally spaced article retaining devices 132 are each secured to chains 110 and 112 by brackets 134 and 136 (FIG. 10), respectively, which are secured to plate 142 which in turn is secured to base 140 as best seen in FIG. 9. A finger 144 having a depending end 146 slidably engages plate 142 and is fixedly secured to a U-shaped member 147 by machine screws shown at 148. A plate 152 and a plate 154 are fixedly secured by machine screws 156 to the U-shaped member 147 on either side of finger 144 and are provided with flanges 158 and 160 which slidably engage the rear base of plate 142 as best seen in FIG. 8 to mount finger 144 and member 147 on base 140 for vertical sliding. U-shaped member 147 carries a pivot pin 162 on which a finger 164 is pivotally mounted. Finger 164 has an end portion 166 which is biased into engagement with depending end 146 of finger 144 by a compression coil spring 168 mounted in housing 170 which is threadably secured to finger 164 as shown at 172 and abuts against U-shaped member 147.

Each retaining device 132 is provided with a cam follower roller 174 on finger 164 and an inwardly projecting lifting member 176 secured to U-shaped member 147 by screws 177 to provide for the lifting of the fingers. Adjacent roller 174 finger 164 has an upper end 165. The front of each device 132 is provided with a cam follower roller 178 secured to finger 164 to provide for lifting of the fingers. A steadying roller 179 is mounted on base 140.

Equally spaced between each article retaining device 132 is an article retaining device 132A as seen in FIG. 2. The devices 132 and 132A are, in all respects, the same with identical parts in devices 132A being given the same numbers as the identical parts in the device 132 with the addition of a prime, there being one exception with respect to the upper cam follower rollers. In the retaining device 132A, cam follower roller 180 is positioned to be at the upper end of finger 164' which is somewhat lower than the upper end of finger 164 so that the top of finger 164 and the top of roller 180 will be about the same height (FIGS. 10 and 11).

Figure 12:
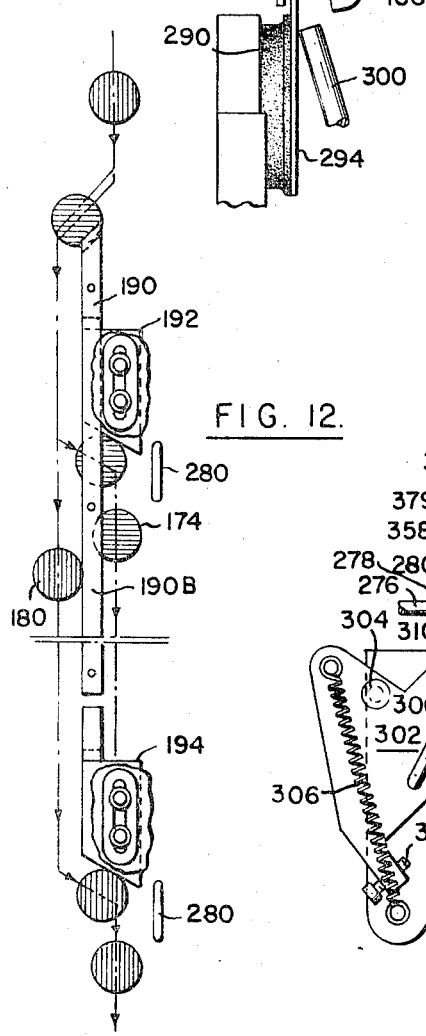
FIG. 12 is a fragmentary view of pickup actuating cams for article retaining devices.
Figure 16:
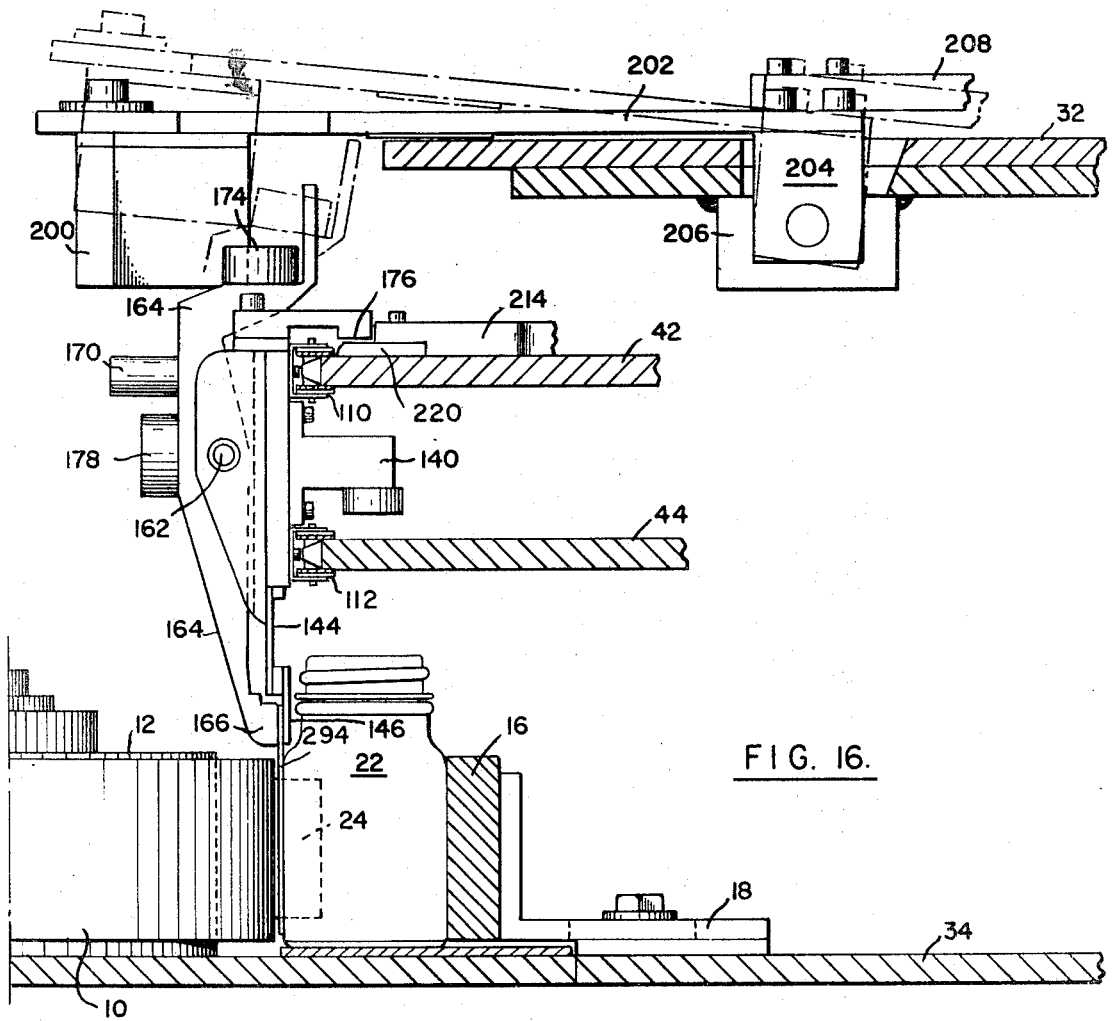
FIG. 16 is a fragmentary view of the device of FIG. 1 showing the placement of an article between a container and a label.

In the vicinity of its associated article magazine to be described shortly, cam follower roller 174 of retaining device 132 engages lower portion 190A of a cam 190 (FIG. 2) secured to plate 32 and an extension thereof 192 to provide for the pivoting of finger 164 away from finger 144 and the subsequent closure of the finger. Similarly, cam follower roller 180 of retaining device 132A engages upper portion 190B of cam 190 and an extension thereof, 194, to provide for the separation and closure of fingers 164' and 144' (see FIGS. 1, 2 and 12). To provide for the release of articles by the retaining devices, there is provided a cam 200 (FIGS. 1 and 18). Cam 200 is mounted on a frame 202 (FIG. 1) which is fixedly secured to blocks 204 and 205 pivotally mounted to blocks 206 and 207 respectively (see also FIG. 16). A counter balancing weight 208 is secured to frame 202 on the opposite of pivot axis from cam 200. This arrangement permits cam 200 to move upwardly on an arc as shown in FIG. 16.

Figure 17:
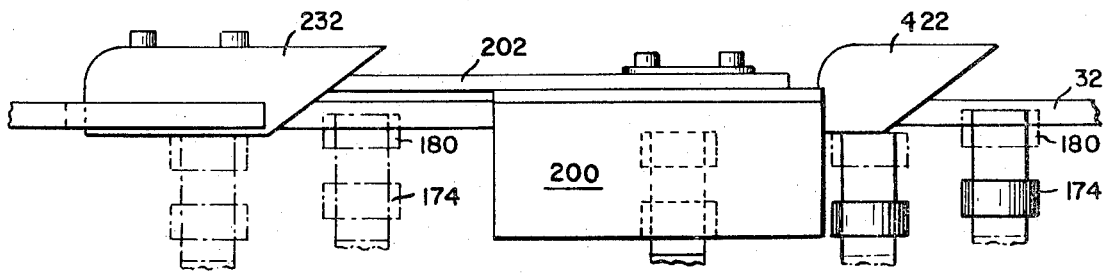
FIG. 17 is a fragmentary side elevation of knock down cams of the device of FIG. 1.
Figure 21:
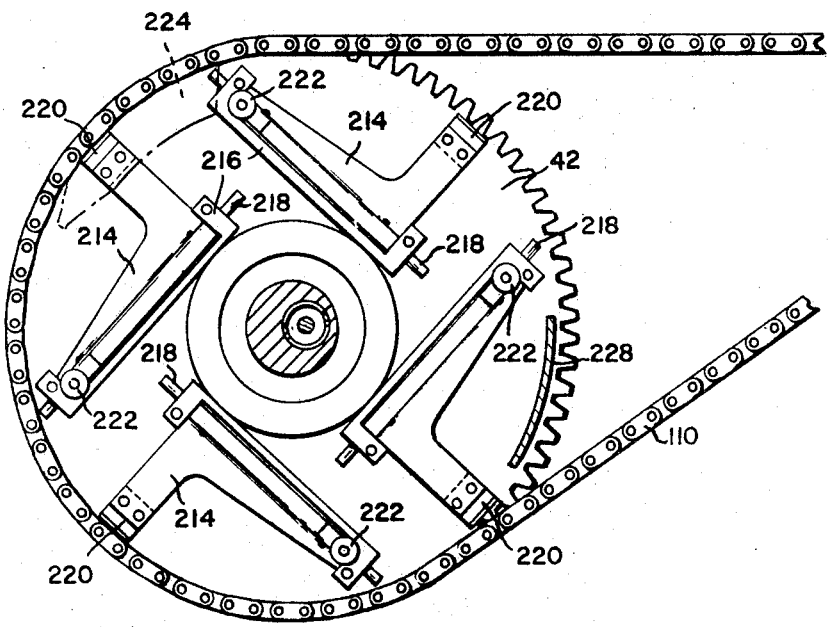
FIG. 21 is a plan view, partially broken away, showing mechanism for lifting the lower portion of an article retaining device after the release of an article.
Figure 22:
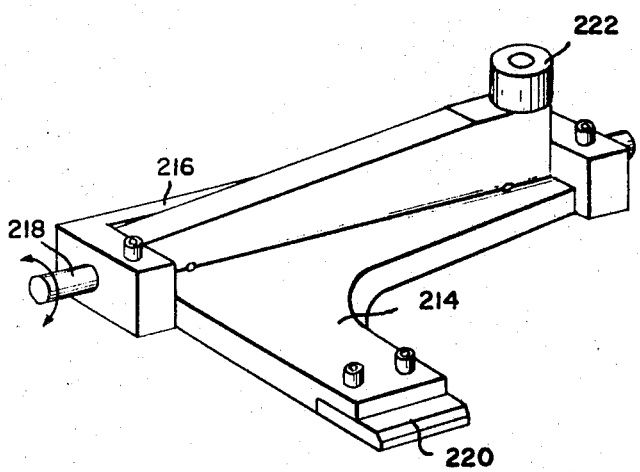
FIG. 22 is an enlarged view of a lever and cam follower employed in the mechanism of FIG. 21.

As best seen in FIG. 21, sprocket 42 has mounted thereon four L shaped levers 214 which are each pivotally mounted in a frame 216 fixedly secured to the upper face of sprocket 42. Each lever 214 is pivotally mounted on a pivot pin 218 secured in a frame 216. A finger 220 is secured to lever 214 and is adapted to engage lifting member 176 or lifting member 176' of retaining devices 132 and 132A respectively. A cam follower roller 222 is mounted on each lever 214 and is adapted to engage a cam 224 (FIG. 2 and FIG. 18). While lever 214 normally pivots to its original position after cam follower 222 is released from cam 224 a knock down cam 228 (FIG. 2) engages finger 220 of lever 214 to insure that lever 214 pivots back to its original position. Similarly, while fingers 164 and 144 normally slide down to their normal positions after being lifted up by levers 214, a knock down cam 232 (FIGS. 1 and 17) is provided to insure this action.

Figure 10:
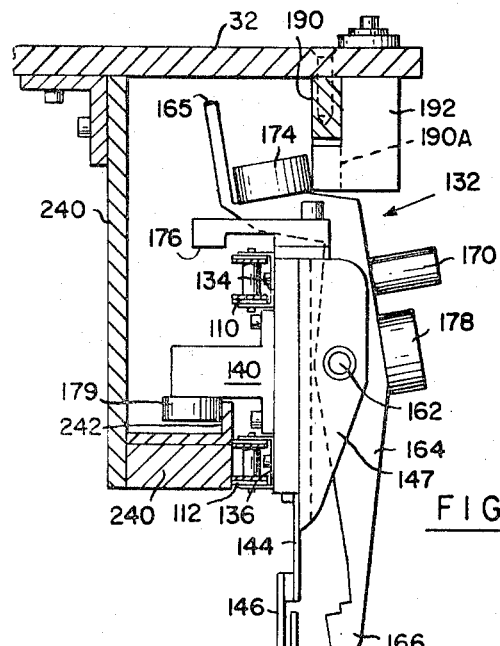
FIG. 10 is a view of the device of FIG. 1, partially broken away, illustrating the pick up action of an article retaining device.
Figure 11:
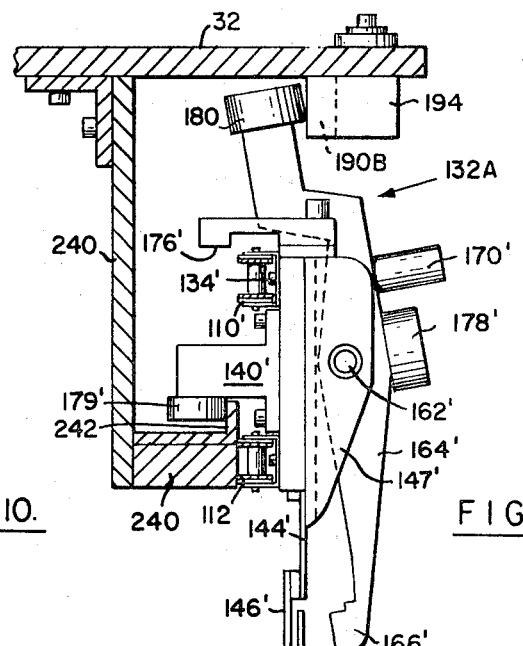
FIG. 11 is view of the device of FIG. 1, partially broken away, illustrating pick up action of an article retaining device.

As the chain 112 passes the circular magazines to be described later, the retaining devices are steadied by chain 112 bearing against the side of a bracket 240, the other side of flange 242 is engaged by rollers 179 (FIG. 10).

Referring now to FIG. 2, shaft 94 has secured thereto a cam 256 which engages a cam follower roller 258 mounted on a lever 260 which is pivotally mounted at 262. Lever 260 is pivotally connected at 264 to a T bar 266 which is slidably mounted in guide bracket 268 (FIG. 14). An extension spring 273 (FIG. 4) is connected to lever 260 and biases cam follower roller 258 against cam 256.

T bar 266 is pivotally connected at 274 to a rod 276 pivotally secured to slide 277 (FIG. 14) which in turn is fixedly secured to a vacuum manifold 278. A rubber suction head 280 is connected to manifold 278. Similarly, T bar 266 is pivotally connected at 284 to a rod 286 secured to a slide (not shown) identical to slide 277 which is fixedly secured to a manifold 288 which carries a rubber suction head 290.

Suction head 280 is associated with a magazine 292 containing folders 294. Suction head 290 is associated with a magazine 296 which is identical with magazine 292 and also contains folders 294. The magazines are spaced apart the distance adjacent retaining means 132 and 132A are spaced apart. Adjacent each suction head 280 and 290 is a hold down bar 300 secured to a plate 302 which is pivotally mounted as indicated at 304. An extension spring 306 biases platee 302 counterclockwise as viewed in FIG. 13 to urge bar 300 towards the adjacent suction head.

Figure 13:
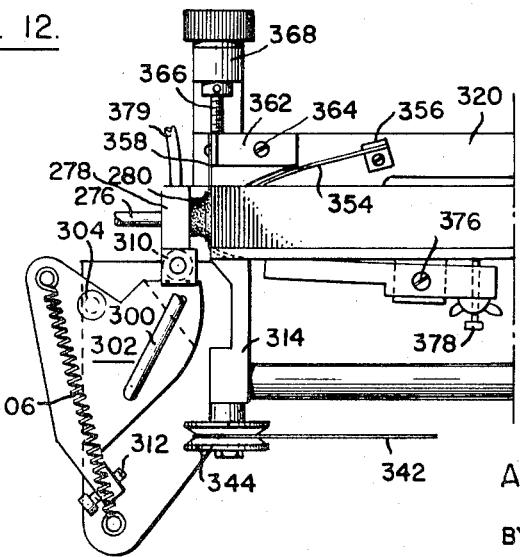
FIG. 13 is a plan view, partially broken away, of the discharge end of an article magazine of the device of FIG. 1.

A roller 310 secured to manifold 278 and 288 engages the adjacent plate 302 to rotate it clockwise, as viewed in FIG. 13, when the manifold is advanced to pickup a circular 294 with the spring 306 acting to return plate 302 to its original position when the adjacent manifold and roller are retracted. A threaded stop member 312 is threadably secured to plate 302 and engages the side of bracket 314 to limit the counterclockwise rotation of plate 302.

Each magazine 292 and 296 has a circular supporting plate 320 having an upstanding flange 322 (FIG. 15) and an adjustable upstanding flange 324 for guiding the circulars 294. The circulars are urged to the left, as viewed in FIG. 15, towards the associated suction head by a follower 326 fixedly secured to a block 328 which in turn is secured to a handle 330. A roller 332 is secured to block 328 rides on the top of flange 322. Follower 326 is fixedly secured to tubular member 334 which is slidably mounted on rod 336 mounted on bracket 314 and 338. Tubular member 334 is provided with a friction drag in the form of a leaf spring 340 secured thereto and engaging rod 336. As indicated at 341, a flexible line 342 is connected to tubular member 334. Line 342 passes over a pulley 344 mounted on bracket 314 and then passes to reel 346 which is driven by a constant force spring motor 348 which, as illustrated, may be the well-known "B" motor. Motor 348 is mounted on bracket 350.

A leaf spring 354 secured to a bracket 356 bears against one side of circulars 294 to force them against flange 322. A pair of leaf springs 358 and 360 engage the outermost circular 294 to hold it until it is withdrawn by a suction head. Spring 358 is secured to bracket 362 secured to plate 320 as indicated at 364 and is urged inwardly by a threaded member 366 threaded to a bracket 368. Similarly, spring 360 is secured to a lever 374 pivotally mounted at 376 and having an adjustment screw 378 threadedly secured to lever 374 bearing against flange 322. As thus described, the magazines are well known to the art.

A flexible line 379 connects manifolds 278 and 288 (FIG. 2) to a valve 380 which is connected to a line 381 connected to a vacuum pump (not shown). Valve stem follower 382 is biased by a spring 383 into engagement with a cam 384 on shaft 94 to open the valve to atmosphere to release circulars 294 and to close the valve to provide suction to pick up circulars 294.

As previously mentioned, plate 32 and the structure supported thereon including chains 110 and 112 can be adjusted to various vertical positions. In addition to being supported on threaded member 84 as previously described, plate 32 is also supported on threaded member 390 (FIG. 2). Member 390 is threadably secured to a collar 392 which is fixedly secured to plate 32. The lower end of threaded member 390 abuts against and is rotatable relative to support member 394 which is secured to a pad 396 in turn fixedly secured to bottom plate 34 by machine screws indicated at 400.

A sprocket 404 is fixedly secured to threaded member 84 and a sprocket 406 is fixedly secured to threaded member 390, the sprockets being connected by a chain 407, to cause threaded members 84 and 390 to rotate equally when threaded member 84 is rotated by handle 408 which is secured to the upper end thereof. The rotation of handle 408 clockwise, as viewed in FIG. 1, causes the elevation of plate 32 as well as the elevation of chains 110 and 112 and their associated mechanisms without changing the angle of the planes in which chains 110 and 112 lie with respect to the plane of conveyor 2. Hubs 54 and 66 being connected together by vertical key 64 may be relatively moved vertically without disturbing the driving connection.

In the case of the use of a relatively short container, it is convenient to provide for the clearance of circulars 194 with respect to bottom plate 34 by providing a cam 420 (FIGS. 2 and 3) which is engaged by cam follower rollers 178 on retaining members 132 and by cam follower rollers 178' on retaining member 132A to elevate the fingers and thus the circular sufficiently to clear bottom plate 34. After the cam follower rollers leave cam 420, a knock down cam 422 (FIGS. 1 and 17) forces the slidable parts of the retaining members downwardly in the event they have not moved downwardly due to gravity. When a relatively tall container is being used cam 420 is not necessary.

OPERATION

In operation, drive shaft 94 drives gear 92 which rotates gear 70, hub 66 and gear 52. Gear 52 rotates gear 50 causing in turn rotation of sprockets 42 and 44 and the continuous drive of chains 110 and 112. When a retaining member 132 is advanced sufficiently for cam follower roller 174 to engage the lower portion 190A of cam 190, finger 164 is cammed away from finger 144 in preparation for engaging a circular 294 from magazine 296. Similarly, retaining device 132A has previously been advanced to bring cam follower roller 180 into engagement with the upper portion 190B of cam 190 to move finger 164' away from finger 144' preparatory to picking up a circular 294 from magazine 292.

Before the retaining devices reach the magazines, the co-action of spring 273 and cam 256 has caused suction heads 280 and 290 to move against the adjacent circular 294 with valve 380 closed by cam 384 and spring 383 and has retracted the suction heads to the position shown in FIG. 4 for the pickup of circulars by the retaining devices. As manifolds 278 and 288 move towards the circulars 294, each roller 310 causes adjacent plate 302 to rotate to move holding bar 300 out of the way of the adjacent suction head. On retraction of the rollers 310 with manifold 278, each holding bar 300 swings in behind the circular held by the adjacent suction head and holds the circular against the suction head.

As fingers 164 and 144 pass to either side of a circular 294 held by suction head 290 and the adjacent hold down bar 300, cam follower roller 174 passes beyond cam 192 permitting the spring closure of finger 164 against finger 144 to grip a circular 294. At the same time, cam follower roller 180 passes beyond cam 194 permitting the spring closure of finger 164' against finger 144' to engage a circular 294 being held by a suction head 280 and the adjacent hold down bar 300. Just before the circulars are thus engaged, the suction heads 280 and 290 move to the rear away from the adjacent circular with the vacuum being cutoff by the opening of valve 380 freeing the circulars from the grip of the bar 300 and the adjacent suction head since the movement of bar 300 is arrested by stop 312.

If, as shown in the drawings, the chains are in a relatively low adjusted position, as the retaining means 132 and 132A reach cam 420, this cam is engaged by cam follower roller 178 and 178' to elevate the retained circulars. After the rollers drop off cam 420, fingers 164 and 144 and their associated elements normally drop by gravity, but if they do not, they are forced down by cam 422.

The retained circular 294 is swung in behind a bottle 22 on conveyor 2 and positioned between the bottle and a label 24 which has its leading edge attached to the bottle. It will be noted that at this point the circular is still positively held by the retaining device. By way of illustration, roller 174 now contacts cam 200 which cams finger 164 away from finger 144 for the release of circular 294 (FIG. 18). Immediately thereafter, finger 220 of lever 214 engages lifting member 176 and moves it upwardly by virtue of engagement of cam follower roller 222 with cam 224 (FIG. 18). This causes the elevation of fingers 164 and 144 to provide clearance for the rotation of circular 294 with bottle 22 and label 24 incident to the movement belt 10 at a greater linear rate than conveyor 2. As cam follower roller 174 moves upwardly, arm 202 rotates about pivot 206 to provide for the free movement of finger 164 which, due to its shape, engages the lower portion of cam 200 as illustrated in FIG. 18. As retaining member 132 advances beyond the finger 220 which elevated it, it moves downwardly by a force of gravity. If this should not occur, knock down cam 232 moves it downwardly. The retaining device is then moved around to engage cam 190 and the cycle is repeated.

It is to be noted, particularly, that each retaining device is advanced from a position where it positions and releases its circular adjacent a bottle along an upwardly inclined plane for a sufficient distance so that the lower portion of the fingers of the retaining device are above the top of the bottle 22 thus permitting them to be moved across the conveyor without hitting a bottle which is being conveyed.

It will be understood that the above described preferred embodiment is merely illustrative and is not intended to be limiting.

I claim:

1. In combination with a conveyor for containers, label transfer means for partially securing a label on each container by placing one end of a label on each container and means for wrapping the label about the container and about an axis substantially normal to the conveyor to complete the securing of the label on the container, the improvement comprising:

article retaining means adapted to pick up an article at a predetermined position and release it at a predetermined position between a container on a conveyor and a label partially secured to the container with the article retaining means extending below the top of the container, and means to continuously transport said article retaining means along an endless path including said predetermined positions, to elevate the article retaining means above the plane of the tops of the containers after the release of said article to clear the containers on the conveyor and the lower the article retaining means below the plane of the tops of the containers before reaching again the second of said predetermined positions.

2. The combination of claim 1 in which the portion of the path leading away from the second mentioned position is in the direction of the run of the conveyor for a substantial distance and inclined upwardly at a substantial angle to carry the article retaining means above the plane of the top of the container.

3. The combination of claim 1 having means to elevate the lower portion of the article retaining means above the article after the article is released.

4. The combination of claim 1 in which the transport means comprises an endless chain.

5. The combination of claim 1 in which the transport means comprises a pair of endless chains.

6. The combination of claim 1 in which the article retaining means comprises a base secured to the transport means and relatively movable finger means mounted on said base for vertical movement with respect to the base.

7. A device in accordance with claim 1 having means to elevate and lower the transport means.

8. The combination of claim 3 in which the means to elevate the lower portion of the article retaining means includes a cam actuated lever.

9. A device in accordance with claim 2 in which the transport means comprises an endless chain mounted on sprockets lying in a plane which lies at an angle to the plane of the conveyor.

10. The combination of claim 2 in which the transport means comprises an endless chain.

11. The combination of claim 2 in which the transport means comprises a pair of endless chains.

12. The combination of claim 10 in which the article retaining means comprises a pair of relatively movable finger means.

13. The combination of claim 12 in which the finger means are mounted for vertical movement.

14. The combination of claim 13 having cam actuator lever means associated with said finger means to elevate them.

References Cited
UNITED STATES PATENTS

| | | | |
|---|---|---|---|
| 3,138,508 | 6/1964 | Fairest | 156—383 |
| 3,440,116 | 4/1969 | Whitecar | 156—70 |

THERON F. CONDON, Primary Examiner

N. ABRAMS, Assistant Examiner

U.S. Cl. X.R.

53—137; 156—383, 571, 572